United States Patent
Halstead et al.

(10) Patent No.: US 7,409,470 B2
(45) Date of Patent: **\*Aug. 5, 2008**

(54) DETERMINING CONFIGURATION DATA IN CONNECTION WITH DYNAMIC RDF

(75) Inventors: Mark J. Halstead, Waltham, MA (US); Dan Arnon, Boston, MA (US); David Meiri, Boston, MA (US)

(73) Assignee: EMC Corporation, Hopkinton, MA (US)

( * ) Notice: Subject to any disclaimer, the term of this patent is extended or adjusted under 35 U.S.C. 154(b) by 429 days.

This patent is subject to a terminal disclaimer.

(21) Appl. No.: 10/995,810

(22) Filed: Nov. 23, 2004

(65) Prior Publication Data

US 2005/0091463 A1 Apr. 28, 2005

Related U.S. Application Data

(62) Division of application No. 09/997,810, filed on Nov. 30, 2001, now Pat. No. 6,862,632.

(60) Provisional application No. 60/332,991, filed on Nov. 14, 2001.

(51) Int. Cl.
 G06F 3/00 (2006.01)
 G06F 12/00 (2006.01)
 G06F 13/00 (2006.01)

(52) U.S. Cl. .............................. 710/32; 710/31; 710/37; 710/36; 710/38; 710/5; 710/16; 711/111; 711/112; 707/10; 707/201; 707/202; 707/203; 707/204; 714/4; 714/6; 714/43; 714/748; 714/749; 709/208; 709/217; 709/229

(58) Field of Classification Search ................ 710/5, 710/16, 32, 36–38, 31; 711/122, 111; 707/10, 707/201–204; 714/46, 43, 748.749; 709/208, 709/217, 229

See application file for complete search history.

(56) References Cited

U.S. PATENT DOCUMENTS 5,799,323 A 8/1998 Mosher et al.

6,044,444 A 3/2000 Ofek (Continued)

FOREIGN PATENT DOCUMENTS

| EP | 1039387 | 9/2000 |
|----|---------|--------|
| EP | 1093051 | 4/2001 |
| EP | 1111509 | 6/2001 |

(Continued)

OTHER PUBLICATIONS

U.S. Appl. No. 09/998,683, "Reversing a Communication Path Between Storage Devices", filed Nov. 30, 2001.

*Primary Examiner*—Tammara R Peyton
(74) *Attorney, Agent, or Firm*—Muirhead and Saturnelli, LLC

(57) ABSTRACT

Dynamically creating a communication path between first and second storage devices, includes creating a connection to a source volume on the first storage device and indicating that the source volume is not ready to transmit data on the communication path, after successfully creating the connection to the source volume, creating a connection to a destination volume on the second storage device and initially indicating that portions of one of: the destination volume and the source volume do not contain valid copies of data, where the destination volume accepts data from the source volume, and after successfully creating the connections to the source and destination volumes, indicating that the source volume is ready to transmit data on the communication path. Dynamically creating a communication path between first and second storage devices, may also include creating at least one of: the source volume and the destination volume. Creating the connection to the source volume may include modifying a table containing configuration information for the first storage device. Creating the connection to the destination volume may include modifying a table containing configuration information for the second storage device.

13 Claims, 7 Drawing Sheets

| U.S. PATENT DOCUMENTS | | | | JP | 07-104945 A | 4/1995 |
|---|---|---|---|---|---|---|
| 6,209,002 B1 | 3/2001 | Gagne et al. | | JP | P2000-132343 A | 5/2000 |
| 6,654,752 B2 | 11/2003 | Ofek | | JP | P2001-518210 A | 10/2001 |
| 6,701,392 B1 * | 3/2004 | Halstead et al. | 710/36 | WO | WO-A-01 04 754 | 1/2001 |
| 6,862,632 B1 | 3/2005 | Halstead et al. | | | | |

FOREIGN PATENT DOCUMENTS

| EP | 1 158 395 A2 | 11/2001 |
|---|---|---|

\* cited by examiner

DETERMINING CONFIGURATION DATA IN CONNECTION WITH DYNAMIC RDF

CROSS REFERENCE TO RELATED APPLICATIONS

This application is a divisional of U.S. patent application Ser. No. 09/997,810 filed on Nov. 30, 2001, now U.S. Pat. No. 6,862,632 which claims priority to U.S. provisional application No. 60/332,991, filed on Nov. 14, 2001.

BACKGROUND OF THE INVENTION

1. Technical Field

This application relates to computer storage devices, and more particularly to communication between storage devices.

2. Description of Related Art

Host processor systems may store and retrieve data using a storage device containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or nor correspond to the actual disk drives. Allowing multiple host systems to access the single storage device unit allows the host systems to share data stored therein.

In some instances, it may be desirable to copy data from one storage device to another. For example, if a host writes data to a first storage device, it may be desirable to copy that data to a second storage device provided in a different location so that if a disaster occurs that renders the first storage device inoperable, the host (or another host) may resume operation using the data of the second storage device. Such a capability is provided, for example, by the Remote Data Facility (RDF) product provided by EMC Corporation of Hopkinton, Mass. With RDF, a user may denote a first storage device as a master storage device and a second storage device as a slave storage device. Other incarnations of RDF may provide a peer to peer relationship between the local and remote storage devices. The host interacts directly with the local storage device, but any data changes made to the local storage device are automatically provided to a remote storage device using RDF. The local and remote storage devices may be connected by a data link, such as an ESCON link or a Fiber Channel link. The RDF functionality may be facilitated with an RDF adapter (RA) provided at each of the storage devices.

In some instances, it may be desirable to modify the RDF configuration system. However, in many cases, such modifications require skilled technicians using special software and non-standard connections to the local storage devices. It is desirable to automate the RDF configuration modification process to allow a host to modify the RDF configuration. In addition, it is desirable that allowing dynamic modifications to RDF configuration will not effect operation of the storage device when individual devices therein need to access the dynamic configuration information.

SUMMARY OF THE INVENTION

According to the present invention, dynamically creating a communication path between first and second storage devices, includes creating a connection to a source volume on the first storage device and indicating that the source volume is not ready to transmit data on the communication path, after successfully creating the connection to the source volume, creating a connection to a destination volume on the second storage device and initially indicating that portions of one of: the destination volume and the source volume do not contain valid copies of data, wherein the destination volume accepts data from the source volume, and after successfully creating the connections to the source and destination volumes, indicating that the source volume is ready to transmit data on the communication path. Dynamically creating a communication path between first and second storage devices, may also include creating at least one of: the source volume and the destination volume. Creating the connection to the source volume may include modifying a table containing configuration information for the first storage device. Creating the connection to the destination volume may include modifying a table containing configuration information for the second storage device. Dynamically creating a communication path between first and second storage devices, may further include, following unsuccessfully creating a connection to the destination volume, destroying the connection to the source volume, in which case, an error may be returned. Portions of the destination volume may be initially indicated as not containing valid data, in which case, dynamically creating a communication path between first and second storage devices, may further include, after indicating that the source volume is ready to transmit data on the communication path, initiating a background copy operation to copy data from the source volume to the destination volume. Portions of the source volume may be initially indicated as not containing valid data, in which case, dynamically creating a communication path between first and second storage devices, may further include, after indicating that the source volume is ready to transmit data on the communication path, initiating a background copy operation to copy data from the destination volume to the source volume. The host may perform an I/O operation on a particular portion of the source volume, in which case, dynamically creating a communication path between first and second storage devices, may further include, in response to the particular portion being indicated as containing invalid data, copying data corresponding to the particular portion from the destination volume to the source volume prior to completing the I/O operation.

According further to the present invention, dynamically creating a communication path between first and second storage devices, includes creating a connection to a destination volume on the first storage device, after successfully creating the connection to the destination volume, creating a connection to a source volume on the second storage device and indicating that the source volume is not ready to transmit data on the communication path and initially indicating that portions of one of: the destination volume and the source volume do not contain valid copies of data, wherein the destination volume accepts data from the source volume and, after successfully creating the connections to the source and destination volumes, indicating that the source volume is ready to transmit data on the communication path. Dynamically creating a communication path between first and second storage devices may further include creating at least one of: the source volume and the destination volume. Creating the connection to destination volume may include modifying a table containing configuration information for the first storage device. Creating the connection to the source volume may include modifying a table containing configuration information for the second storage device. Dynamically creating a communication path between first and second storage devices may further include, following unsuccessfully creating a connection to the source volume, destroying the connection to the destination volume, in which case, an error indication may be returned. Portions of the destination volume may be initially indicated as not containing valid data. Dynamically creating a communication path between first and second storage devices may further include, after indicating that the source volume is ready to transmit data on the communication path, initiating a background copy operation to copy data from the source volume to the destination volume. Portions of the source volume may be initially indicated as not containing valid data. Dynamically creating a communication path between first and second storage devices may further include, after indicating that the source volume is ready to transmit data on the communication path, initiating a background copy operation to copy data from the destination volume to the source volume. Dynamically creating a communication path between first and second storage devices may further include, the host performing an I/O operation on a particular portion of the source volume. Dynamically creating a communication path between first and second storage devices may further include, in response to the particular portion being indicated as containing invalid data, copying data corresponding to the particular portion from the destination volume to the source volume prior to completing the I/O operation.

According further to the present invention, a computer program product that creates a communication path between first and second storage devices, includes executable code that creates a connection to a source volume on the first storage device and indicates that the source volume is not ready to transmit data on the communication path, executable code that creates a connection to a destination volume on the second storage device and initially indicates that portions of one of: the destination volume and the source volume do not contain valid copies of data after successfully creating the connection to the source volume, wherein the destination volume accepts data from the source volume, and executable code that indicates that the source volume is ready to transmit data on the communication path after successfully creating the connections to the source and destination volumes. The computer program product may further include executable code that creates at least one of: the source volume and the destination volume. The executable code that creates the connection to the source volume modifies a table may contain configuration information for the first storage device. Executable code that creates the connection to the destination volume may modify a table containing configuration information for the second storage device. The computer program product may further include executable code that destroys the connection to the source volume following unsuccessfully creating a connection to the destination volume, in which case an error indication may be returned. The computer program product may further include executable code that causes portions of the source volume to be initially indicated as not containing valid data. The computer program product may further include executable code that initiates a background copy operation to copy data from the destination volume to the source volume after indicating that the source volume is ready to transmit data on the communication path. The computer program product may further include executable code that copies data corresponding to a requested portion from the destination volume to the source volume prior to completing an I/O operation in response to the requested portion being indicated as containing invalid data.

According further to the present invention, a computer program product that dynamically creates a communication path between first and second storage devices, includes executable code that creates a connection to a destination volume on the first storage device, executable code that creates a connection to a source volume on the second storage device and indicates that the source volume is not ready to transmit data on the communication path and initially indicates that portions of one of: the destination volume and the source volume do not contain valid copies of data after successfully creating the connection to the destination volume, wherein the destination volume accepts data from the source volume, and executable code that indicates that the source volume is ready to transmit data on the communication path after successfully creating the connections to the source and destination volumes. The computer program product may further include executable code that creates at least one of: the source volume and the destination volume. Executable code that creates the connection to the source volume may modify a table containing configuration information for the first storage device. Executable code that creates the connection to the destination volume may modify a table containing configuration information for the second storage device. The computer program product may further include executable code that destroys the connection to the destination volume following unsuccessfully creating a connection to the source volume, in which case an error indication may be returned.

DETAILED DESCRIPTION OF VARIOUS EMBODIMENTS

Figure 1:
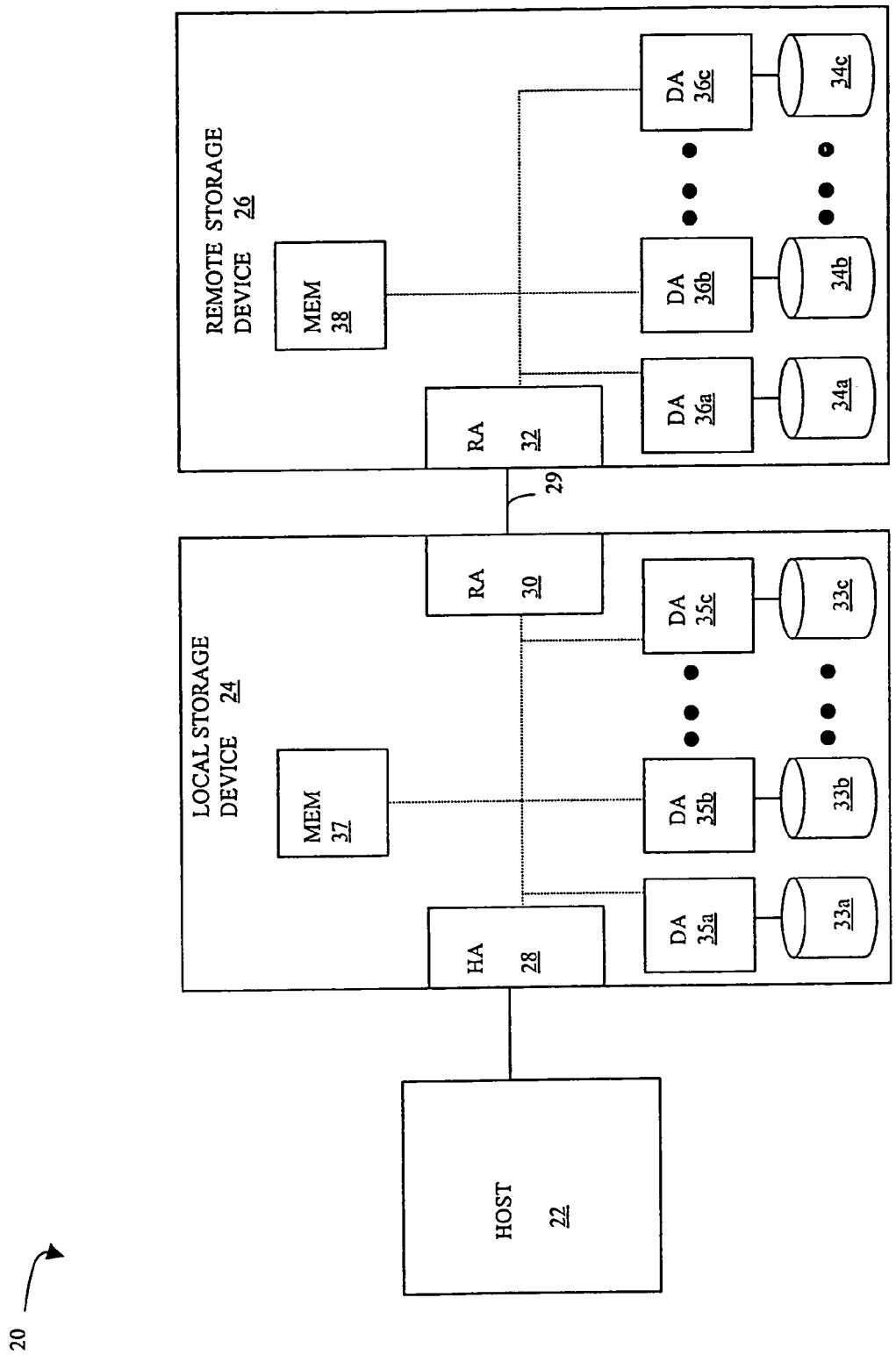
FIG. 1 is a schematic diagram showing a host, a local storage device, and a remote data storage device used in connection with the system described herein.

Referring to FIG. 1, a diagram 20 shows a relationship between a host 22, a local storage device 24 and a remote storage device 26. The host 22 reads and writes data from and to the local storage device 24 via a host adapter 28, which facilitates the interface between the host 22 and the local storage device 24. Data from the local storage device 24 is copied to the remote storage device 26 via an RDF link 29 to cause the data on the remote storage device 26 to be identical to the data on the local storage device 24. Note that there may be a time delay between the transfer of data from the local storage device 24 to the remote storage device 26, so that the remote storage device 26 may, at certain points in time, contain data that is not identical to the data on the local storage device 24. Communication using RDF is described, for example, in U.S. Pat. Nos. 5,742,792, and 5,544,346, both of which are incorporated by reference herein.

The local storage device 24 includes an RDF adapter unit (RA) 30 and the remote storage device 26 includes an RA 32. The RA's 30, 32 are coupled to the RDF link 29 and are similar to the host adapter 28, but are used to transfer data between the storage devices 24, 26. The software used in connection with the RA's 30, 32 is discussed in more detail hereinafter.

The storage devices 24, 26 may include one or more disks, each containing a different portion of data stored on each of the storage devices 24, 26. FIG. 1 shows the storage device 24 including a plurality of disks 33a, 33b, 33c and the storage device 26 including a plurality of disks 34a, 34b, 34c. The RDF functionality described herein may be applied so that the data for at least a portion of the disks 33a-33c of the local storage device 24 is copied, using RDF, to at least a portion of the disks 34a-34c of the remote storage device 26. It is possible that other data of the storage devices 24, 26 is not copied between the storage devices 24, 26, and thus is not identical.

Each of the disks 33a-33c is coupled to a corresponding disk adapter unit (DA) 35a, 35b, 35c that provides data to a corresponding one of the disks 33a-33c and receives data from a corresponding one of the disks 33a-33c. Similarly, a plurality of DA's 36a, 36b, 36c of the remote storage device 26 are used to provide data to corresponding ones of the disks 34a-34c and receive data from corresponding ones of the disks 34a-34c. A data path exists between the DA's 35a-35c, the HA 28 and RA 30 of the local storage device 24. Similarly, a data path exists between the DA's 36a-36c and the RA 32 of the remote storage device 26.

The local storage device 24 also includes a global memory 37 that may be used to facilitate data transferred between the DA's 35a-35c, the HA 28 and the RA 30. The memory 37 may contain parameters from system calls, tasks that are to be performed by one or more of the DA's 35a-35c, the HA 28 and the RA 30, and a cache for data fetched from one or more of the disks 33a-33c. Similarly, the remote storage device 26 includes a global memory 38 that may contain parameters from system calls, tasks that are to be performed by one or more of the DA's 36a-36c and the RA 32, and a cache for data fetched from one or more of the disks 34a-34c. Use of the memories 37, 38 is described in more detail hereinafter.

The storage space in the local storage device 24 that corresponds to the disks 33a-33c may be subdivided into a plurality of volumes or logical devices. The logical devices may or may not correspond to the physical storage space of the disks 33a-33c. Thus, for example, the disk 33a may contain a plurality of logical devices or, alternatively, a single logical device could span both of the disks 33a, 33b. Similarly, the storage space for the remote storage device 26 that comprises the disks 34a-34c may be subdivided into a plurality of volumes or logical devices, where each of the logical devices may or may not correspond to one or more of the disks 34a-34c.

Providing an RDF mapping between portions of the local storage device 24 and the remote storage device 26 involves setting up a logical device on the remote storage device 26 that is a remote mirror for a logical device on the local storage device 24. The host 22 reads and writes data from and to the logical device on the local storage device 24 and the RDF mapping causes modified data to be transferred from the local storage device 24 to the remote storage device 26 using the RAs, 30, 32 and the RDF link 29. In steady state operation, the logical device on the remote storage device 26 contains data that is identical to the data of the logical device on the local storage device 24. The logical device on the local storage device 24 that is accessed by the host 22 is referred to as the "R1 volume" (or just "R1") while the logical device on the remote storage device 26 that contains a copy of the data on the R1 volume is called the "R2 volume" (or just "R2"). Thus, the host reads and writes data from and to the R1 volume and RDF handles automatic copying and updating of the data from the R1 volume to the R2 volume.

In some situations, it may be beneficial to allow the host 22 to create and destroy RDF volumes during operation of the system. Note that RDF volumes may be created and destroyed in pairs so that an R1/R2 pair may be destroyed or an R1/R2 pair may be created. Creating or destroying R1/R2 pairs may be initiated by the host 22. The host may send a multihop/multiexecute system command, such as described in U.S. patent application Ser. No. 09/867,136 filed on May 29, 2001, which is incorporated by reference herein. The multihop/multiexecute system command is a single system command that is provided to multiple storage devices and indicates operations to be performed by the multiple storage devices. For example, the host 22 may send a multihop/multiexecute system command requesting that a particular R1/R2 pair be destroyed where the R1 volume is on the local storage device 24 and the R2 volume is on the remote storage device 26 by having each of the storage devices 24, 26 locally modify a table (discussed in more detail below) that is used internally by each of the storage devices 24, 26 to govern setting up and managing RDF volumes. Creating an R1/R2 pair involves creating the R1 volume on one storage device and creating the R2 volume on another storage device.

Further note that, in certain instances, it may be useful to establish an RDF connection to one or more existing volumes. Thus, for example, an existing source volume may be connected to newly-created destination volume using RDF. Accordingly, for the discussion set forth herein, references to creating volumes may be understood to include creating connections to existing volumes. Similarly, references to destroying volumes may be understood to include simply destroying RDF connections thereto, as appropriate. Note that, both in the case of creating or destroying new volumes and in the case of creating or destroying simply the connections to existing volume, the same tables (discussed below) that contain RDF connection data are modified.

Figure 2:
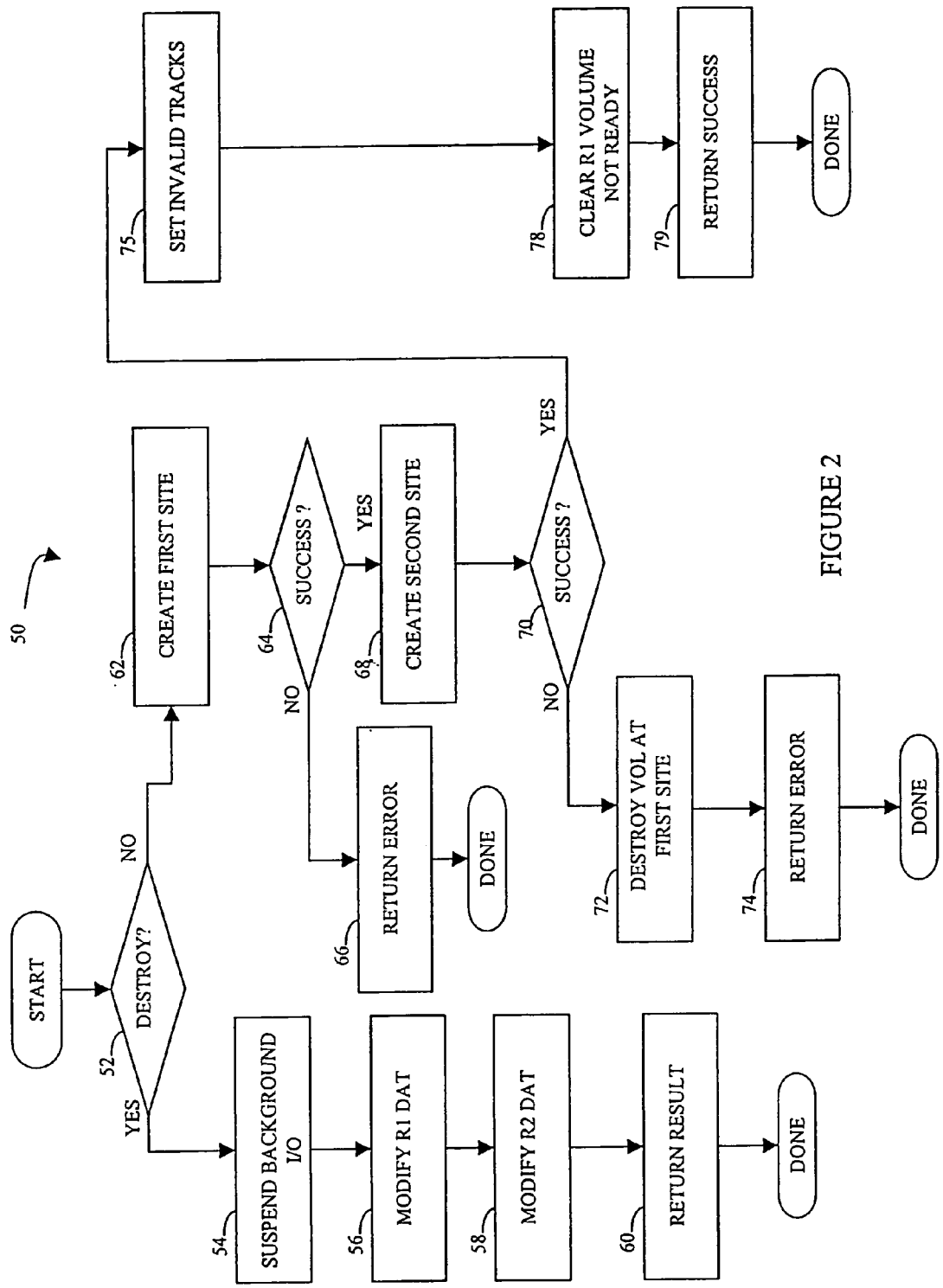
FIG. 2 is a flow chart illustrating operation of the system described herein.

Referring to FIG. 2, a flow chart 50 illustrates steps performed in connection with creating or destroying R1/R2 pairs. Processing begins at a first step 52 where it is determined if a destroy command is being issued. In some embodiments, only create or destroy commands are issued. Thus, if a command is not a destroy command, the command is a create command. If it is determined at the step 52 that a destroy command was issued, then control passes from the step 52 to a step 54 any where background I/O operations, such as background copying, are suspended. Prior to destroying the R1/R2 pair, it is useful to first suspend any background I/O. In other embodiments, the step 54 is not necessary and not executed because destroying the volumes will cause background I/O (and other operations involving the R1/R2 pair) to cease automatically.

Following the step 54 is a step 56 where an allocation table on the storage device corresponding to the R1 volume is modified. The allocation table contains dynamic information about the RDF configuration of a storage device. The allocation table may contain a two dimensional array indexed by logical device identifiers (such as numbers) and by mirror numbers for each of the logical devices. In some embodiments, each device may have up to four mirrors. Other embodiments may employ more than four mirrors. Entries for the allocation table may indicate whether a mirror for a device is a local mirror, an R1 volume, an R2 volume, or some other type of mirror, such as BCV or a RAID mirror.

At the step 56, the allocation table on the storage device containing the R1 volume is modified to remove the R1 volume. Following the step 56 is a step 58 where the allocation table on the storage device containing the R2 volume is modified to remove the R2 volume. Following the step 58 is a step 60 where the result of the previously executed operations (e.g., success or failure) is returned. Following the step 60, processing is complete.

If it is determined at the step 52 that a destroy command is not being issued (and hence a create command is being issued), then control passes from the step 52 to a step 62 where the R1 or R2 volume is created at a first site. In one embodiment, the host issues the multihop/multiexecute command to a first storage device such as the local storage device 24, in which case the first site would be the local storage device 24 (i.e., the first site to receive the command). In an embodiment illustrated herein, the first site on which the creation of an R1/R2 pair is attempted is the local storage device 24 that is coupled directly to the host 22. Creation at the first cite includes modifying the appropriate allocation table. Following the step 62 is a test step 64 where it is determined if creation of the R1 or R2 volume at the step 62 was successful. If not, control passes from the step 64 to a step 66 where an error indication is returned to the host 22. Following the step 66, processing is complete.

If it is determined at the test step 64 that the creation of the R1 or R2 volume at the step 62 was successful, then control passes from the step 64 to a step 68 where the R1 or R2 volume, as the case may be, is created at a second site. Creation at the second site includes modifying the appropriate allocation table. The second site may be the second storage device to receive the command. In an embodiment illustrated herein, the second site is the remote storage device 26 that receives a command from the host 22 through the local storage device 24.

Following the step 68 is a test step 70 where it is determined if creation at the step 68 was successful. If it is determined at the test step 70 that the creation at the second site was not successful, then control passes from the step 70 to a step 72 where the first site that was created is destroyed. Note that R1 and R2 volumes are created in pairs so that failure to create one of the volumes at the second site causes the volume that was successfully created at the first site to be destroyed at the step 72. Following the step 72 is a step 74 where an error is returned to the host 22 in a manner similar to returning an error at the step 66, discussed above. Following the step 74, processing is complete.

If it is determined at the test step 70 that creation of the R1 or R2 volume at the second site at the step 68 was successful, control transfers from the step 70 to a step 75 where invalid tracks for each of the storage devices 24, 26 are set. The invalid tracks are used to indicate differences between the R1 and R2 volumes. In instances where the R1 volume contains the initial data, all of the tracks of the R1 volume are set to invalid indicating that all of the R1 data is inconsistent with the R2 data, and thus needs to be copied from R1 to R2. If the R2 volume contains the initial data to be used, then all of the tracks of the R2 volume are invalidated and a Sync command is provided to the storage device containing the R1 volume to cause the tracks of the local mirror corresponding to the R1 volume to be invalidated, thus initiating a background copy of data from R2 to R1. Following the step 75 is a step 78 where a not ready indicator for the R1 volume is cleared, indicating that RDF operations between R1 and R2 may commence. Note that the not ready indicator refers to the R1/R2 link, and not necessarily to the ability of R1 and/or R2 to accept data from a host. Note that data can be organized in units other than tracks, in which case, the operations disclosed herein would be performed on whatever units other than tracks that are used.

Following the step 78 is a step 79 where an indicator that the operation was successful is returned to the host 22. Following the step 79, processing is complete. Note that setting invalid tracks and setting and clearing device not ready status, discussed above, may be performed in a different order than that indicated in FIG. 2 and discussed above, provided that the settings are maintained in an appropriate state during the creation operation and thereafter.

In some embodiments, it may be useful to create and destroy the R1/R2 volumes in a particular order. For example, it may be useful to create the R2 volume first followed by the R1 volume. Similarly, it may be useful to destroy the R1 volume first followed by destroying the R2 volume. Alternatively, the volumes may be created and destroyed in any order while operations may be controlled by setting a not ready indicator for the R1 volume, where the not ready indicator for the R1 volume controls whether operations take place. Thus, the R1 and R2 volumes may be created in any order, but the not ready indicator of the R1 volume is not set to indicate ready unless and until both R1 and R2 have been created. Similarly, setting the not ready indicator for R1 as a first step allows subsequent steps for destroying R1 and R2 to take place in any order.

In some embodiments, it may be useful to have the command that creates the R1/R2 pair indicate the specific volumes to be used for both the R1 volume and the R2 volume. That is, the host 22 may select an existing logical device from the local storage device 24 as the R1 volume and, in addition, may select an existing logical device from the remote storage device 26 as an R2 volume. In an alternative embodiment, it may be possible to have the remote storage device 26 select any unused logical device as the R2 volume. Alternatively still, an API may be layered on to one of the storage devices 24, 26 and/or the host 22 to pick the R2 volume in instances where the system command expects specific volume identification for the R2 volume.

Note, in addition, there may be situations where the initial data for a newly-created R1/R2 pair is found on the R2 volume. For example, if the remote storage device 26 has coupled thereto a host (not shown) that fails, it may be useful to restart the system with the host 22 coupled to the local storage device 24. However, in that case, the initial data for starting up may be located on the R2 volume (i.e., on the remote storage device 26). Thus, at start up, the initial data is copied from the R2 device to the R1 device, after which the host 22 maintains normal RDF operation with the R1 device being located on the local storage device 24 and the R2 device being located on the remote storage device 26. The copy from the R2 device to the R1 device (or, from an R1 device to an R2 device) may be provided using a background copy.

Figure 3:
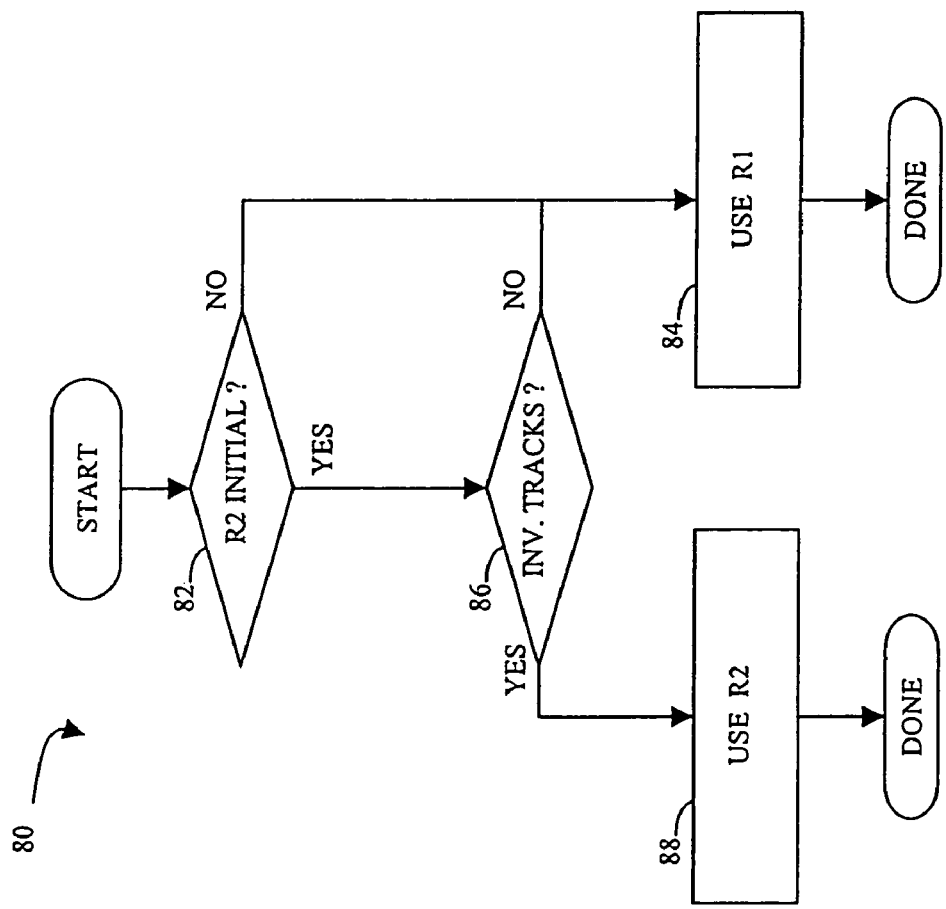
FIG. 3 is a flow chart illustrating determining which volumes to use for read and write operations according to the system described herein.

Referring to FIG. 3, a flow chart 80 illustrates operation of the system after an R1/R2 pair is initialized but prior to completion of the background copy. Note that the host 22 may read and write from and to an R1 volume even if the background copy has not completed.

Processing begins at an initial test step 82 where it is determined if the R2 volume contains the initial data. If not, then control passes from the test step 82 to a step 84 where the R1 volume is used for the read or write operation requested by the host 22.

If it is determined at the test step 82 that the R2 volume is specified as containing the initial data, then control passes from the test step 82 to a test step 86 where it is determined if the track being written to or read from is invalid. An invalid track indicates that the initial data, located on the R2 volume, has not yet been copied back to the R1 volume. Setting invalid tracks is discussed above in connection with FIG. 1. Thus, if it is determined at the test step 86 that the track being written to or read from by the host 22 is invalid, control passes from the step 86 to a step 88 where the R2 volume is used for the read or write operation using RDF. Note that, in some instances, less than an entire track is written by the host. Thus, for an invalid track where R2 contains the initial data, it is useful to have the data from the host 22 provided to the R2 volume. Following the step 88, processing is complete. Alternatively, if it is determined at the test step 86 that the track being read to or written from is not invalid, then control passes from the test step 86 to the step 84 where the R1 volume is used, in a conventional fashion. Following the step 84, processing is complete.

Figure 4:
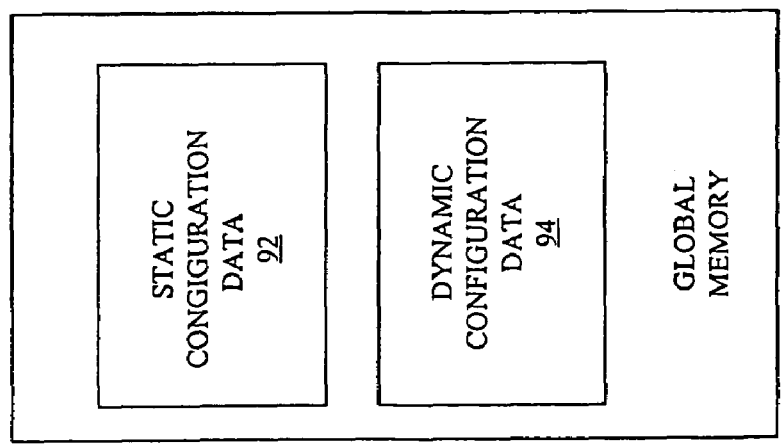
FIG. 4 is a diagram illustrating global memory for storage devices according to the system described herein.

Referring to FIG. 4, a diagram shows global memory that could represent the memory 37 of the local storage device 24 or the memory 38 of the remote storage device 26. The global memory includes a memory location for static configuration data 92 and a memory location for dynamic configuration data 94, such as the allocation table, discussed above. Static configuration data 92 includes configuration information for the storage device that is set up at the factory or by a technician. The static configuration data 92 may be provided in a file that is read into global semiconductor memory or it may provided in non-volatile portions of semiconductor memory.

The dynamic configuration data 94 represents the configuration of the corresponding system that has been modified from the static configuration data 92. Thus, for example, the static configuration data 92 may indicate that particular volumes form an R1/R2 RDF pair while the dynamic configuration data 94 overrides the static configuration data 92 by indicating that the particular R1/R2 RDF pair has been subsequently destroyed. The dynamic configuration data 94 may also be stored on a disk and read into electronic memory and/or may be stored in electronic memory that is non-volatile. In some embodiments, the dynamic configuration data 94 may override the static configuration data 92. In other embodiments, the dynamic configuration data 94 is only additive and may only be used in instances where there is no entry in the static configuration data 92 corresponding to an item.

Figure 5:
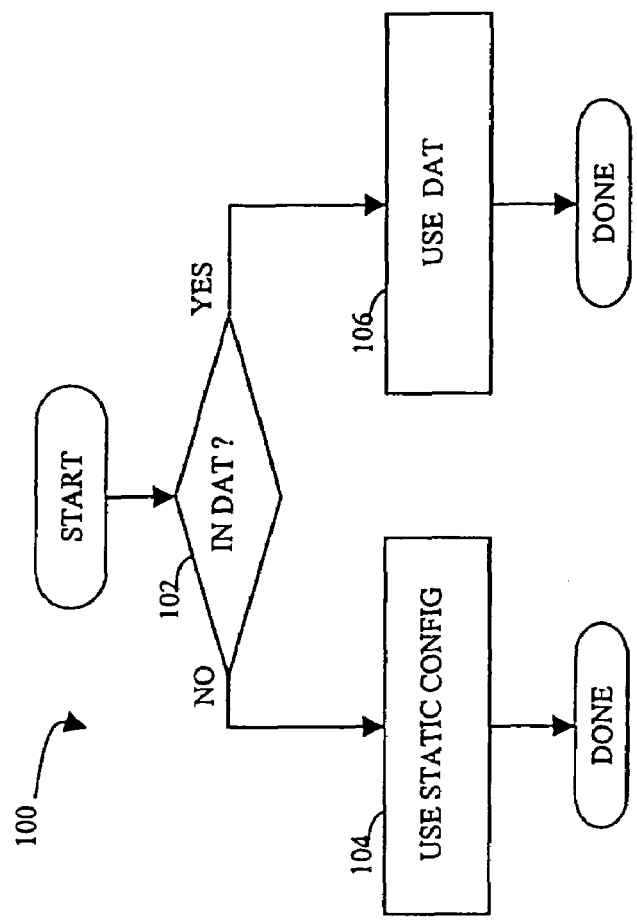
FIG. 5 is a flow chart illustrating a hierarchy for determining whether to use static or dynamic configuration data in connection with assessing RDF configuration of a device according to the system described herein.

Referring to FIG. 5, a flow chart 100 illustrates determination of a configuration of a particular logical device. Note that each read or write access from or to a logical device uses knowledge of the configuration of the device to determine if, for example, the device is part of an R1/R2 pair.

Processing begins at a first step 102 where it is determined if there is an entry for the logical device in the dynamic configuration data 94. If not, then control passes from the step 102 to a step 104 where the static configuration data 92 is consulted to determine the configuration of the device. Note that it is possible for each logical device to have a local, and thus easily accessible, copy of the static configuration data 92 since, by definition, the static configuration data 92 does not change. Following the step 104, processing is complete.

If it is determined at the test step 102 that there is an entry for the logical device in the dynamic configuration data 94, then control passes from the test step 102 to a step 106 where the dynamic configuration data 94 is used to determine the configuration of the logical device. Note that, as an alternative, it is possible to first check the static configuration data 92 and then check to see if an overriding entry exists in the dynamic configuration data 94.

Figure 6:
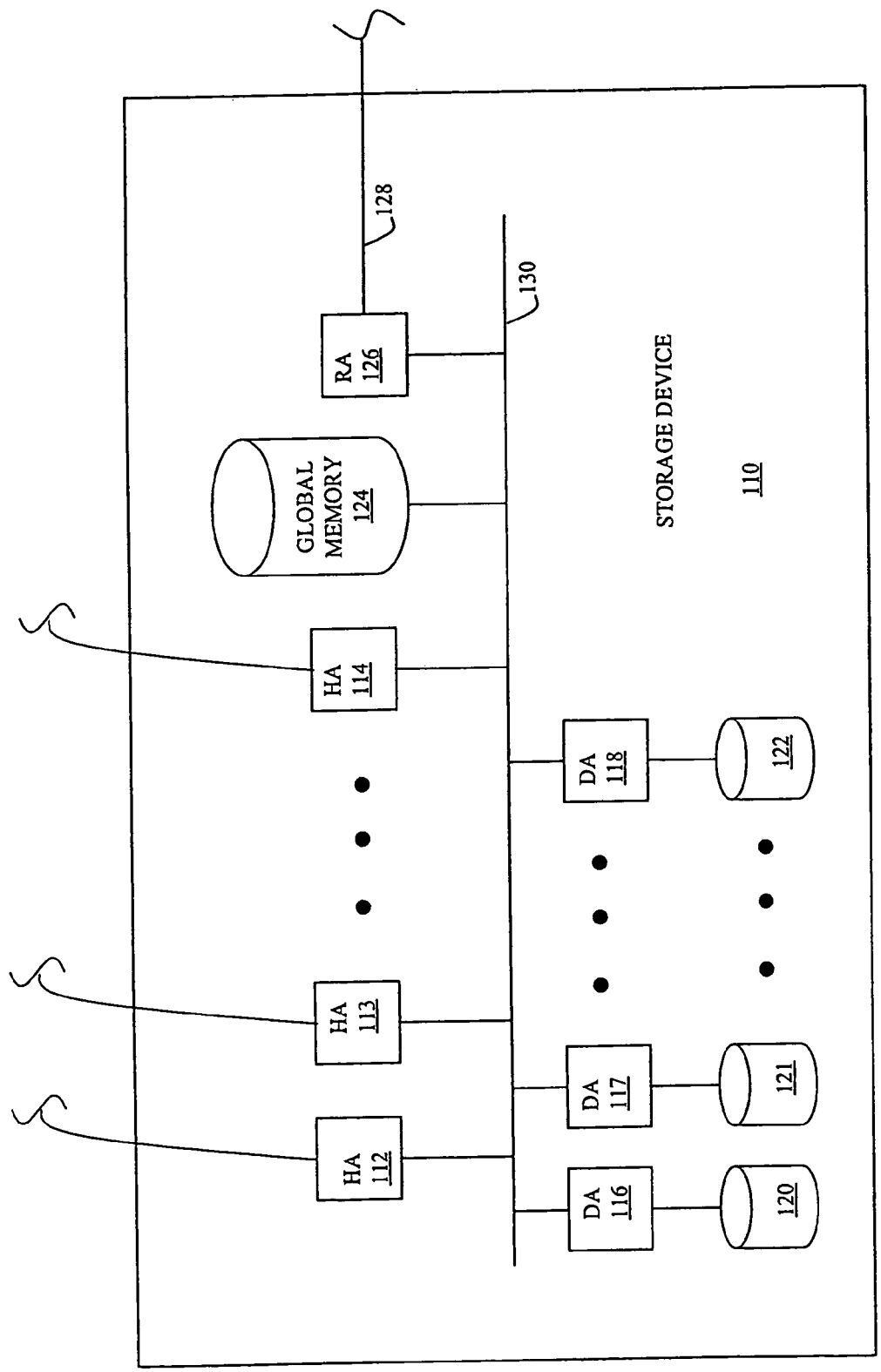
FIG. 6 is a schematic diagram showing in detail a storage device and components thereof used in connection with the system described herein.

Referring to FIG. 6, a diagram shows a storage device 110 in more detail. The storage device 110 includes a plurality of host adapters 112-114 and a plurality of disk adapters 116-118. Each of the disk adapters 116-118 is coupled to a respective one of a plurality of disks 120-122. The storage device 110 also includes a global memory 124 an RDF adapter (RA) 126 and an outside connection 128 to the RA 126. A bus 130 connects the HAs 112-114, the DAs 116-118, the global memory 124 and the RA 126. Each of the HAs 112-114 includes a connection for coupling to a host (not shown).

For every read and write operation performed by one of the hosts coupled to one of the HAs 112-114, the corresponding one of the HAs 112-114 determines where the data is to be placed. For example, if the storage device 110 includes a local volume of an R1/R2 pair, the particular one of the HAs 112-114 that receives the data from the host must be able to direct the data to the correct one of the disk adapters 116-118 in order to provide the data to the R1 volume and must also be able to appropriately direct the data to the RA 126 that provides the data to the R2 volume on another storage device (not shown). In addition, in connection with a background copy operation, the DAs 116-118 access information indicating the source and destination of the data. Thus, for example, if an R1/R2 pair is set up between the storage device 110 and another remote storage device (not shown), then the DAs 116-118 would assist in the background copy of data from the volume containing the initial data (R1 or R2) to the other volume. In such a case, the DAs 116-118 access information that indicates where the data should go (i.e., which volume is the corresponding one of the volumes of the R1/R2 pair). Similarly, it is useful for the RA 126 to access the configuration information for the volumes in order to be able to process incoming data, for example.

Accordingly, it is useful for the HAs 112-114, the DAs 116-118 and the RA 126 to be able to have access to accurate information indicating the set up configuration of the volumes on the storage device 110. One way to obtain the information is to read the dynamic configuration data 94 from global memory 124 for each read or write operation and then, if the device for which the inquiry is made is not found in the dynamic configuration data 94, to then access the static configuration data 92. However, accessing global memory for every I/O operation could adversely impact the performance of the storage device 110. Accordingly, a more efficient mechanism for determining the configuration of the devices of the storage device 110 is provided.

Figure 7:
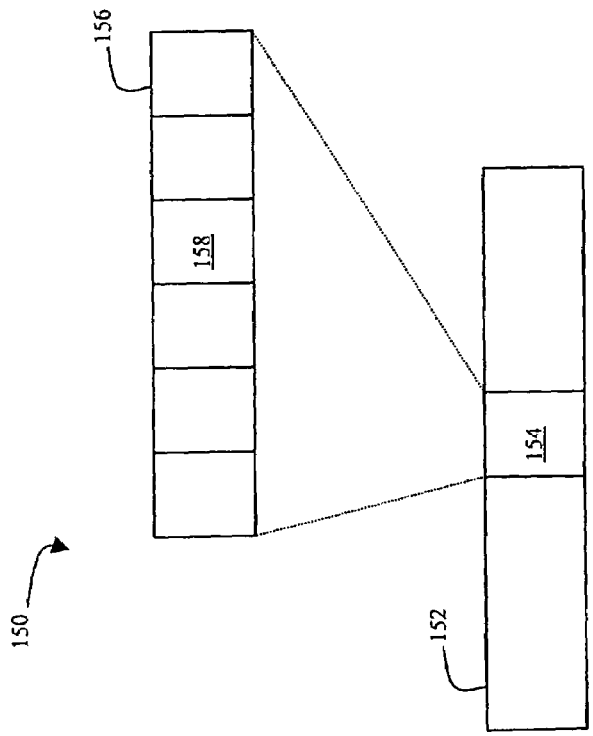
FIG. 7 is a diagram illustrating a ready buffer and a set of bytes used in connection with the system described herein.

Referring to FIG. 7, a diagram 150 illustrates a mechanism for decreasing the number of accesses to global memory used to determine configuration data. A ready buffer 152 represents data that is accessed each time an I/O is performed. The ready buffer 152 indicates useful I/O related information, such as the state of the devices and/or the state of the system. Thus, the ready buffer 152 is accessed for each I/O operation.

The ready buffer 152 include a revision number field 154 which, in some embodiments, is a byte of data that is incremented each time a device configuration has changed. Thus, a device performing an I/O can look to the revision number field 154 to determine if further inquiry is necessary.

A set of bytes 156 may be accessed in response to the revision number field 154 changing. A particular byte 158 of the set of bytes 156 could be used to indicate a change in the dynamic RDF configuration for the storage device. Thus, the combination of the ready buffer 152 and the set of bytes 156 may be used to minimize accesses to global memory 124 each time an I/O is performed.

Figure 8:
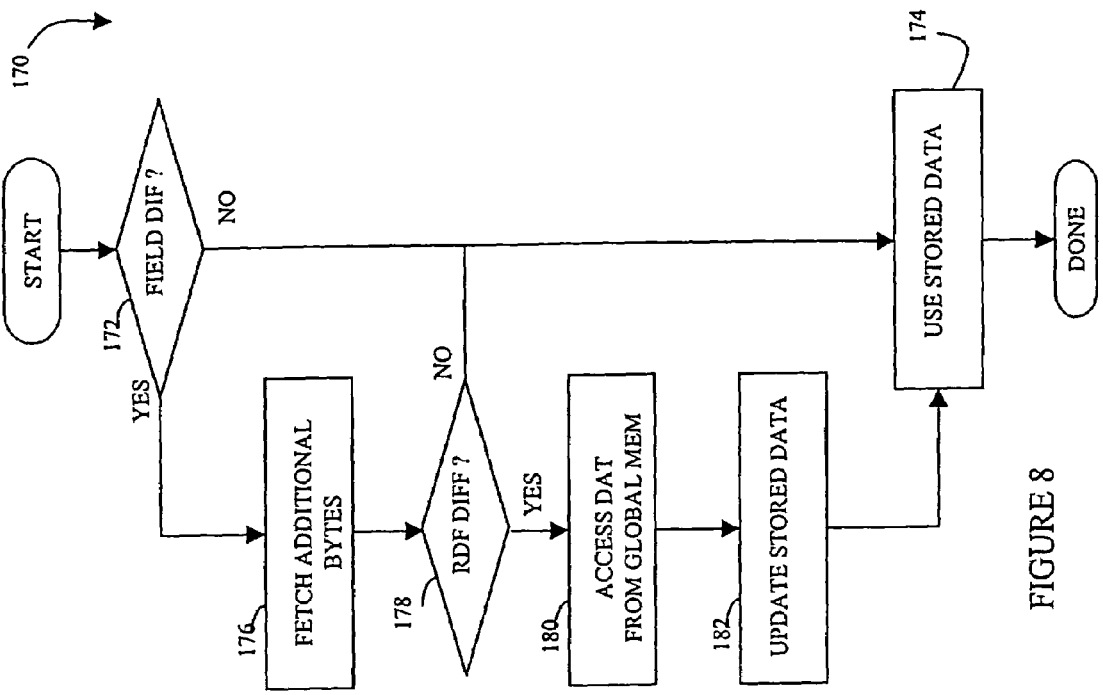
FIG. 8 is a flow chart illustrating steps performed in connection with accessing the ready buffer and the set of bytes set forth in FIG. 7.

Referring to FIG. 8, a flow chart 170 illustrates steps performed in connection with using the ready buffer 152 and the set of bytes 156. Processing begins at a first step 172 where a device performing an I/O determines if the ready buffer field 154 has changed (e.g., incremented). If it is determined at the step 172 that the ready buffer field has not changed, then control passes from the step 172 to a step 174 where the device, such as one of the HAs 112-114, one of the DAs 116-118, and/or the RA 126, uses a locally stored data to determine configuration information. That is, the revision number field 154 being equal to a previously observed version of the revision number field 154 indicates that no changes have been made to the RDF configuration. Thus, control passes from the step 172 to the step 174 where a locally stored copy of the configuration data may be used by the device performing the I/O in order to determine how to handle particular data. Following the step 174, processing is complete.

If it is determined at the test step 172 that the revision number field 154 has changed, then control passes from the step 172 to a step 176 where the set of bytes 156 is fetched. The set of bytes 156 may be stored, for example, in global memory 124 or in another memory, such as non-volatile electronic memory or on a disk.

Following the step 176 is a test step 178 where it is determined if the byte 158 in the set of bytes 156 corresponding to an RDF configuration change has been modified (e.g., incremented). If not, then control passes from the step 178 to the step 174, discussed above, where the stored local copy of the configuration data is used to determine the RDF configuration. Following step 174, processing is complete.

If it is determined at the test step 178 that the RDF configuration has changed, then control passes from the step 178 to a step 180 where the dynamic configuration data 94 in the global memory 124 is accessed. Following the step 180 is a step 182 where the stored local copy of the configuration data is updated with the new version of the data from global memory 124. Following the step 182 is the step 174 where the locally stored version of the configuration data (which has just been updated) is used by the device to determine the RDF configuration. Following the step 174, processing is complete.

In some embodiments, it is possible to also include a background mechanism that periodically accesses the dynamic configuration data from the allocation table and updates the local copy of the configuration data in the storage for each device. Thus, each device may be updated by this background task without first having to perform an I/O.

Note that the mechanism discussed herein for using revision numbers to control accesses to global memory when determining the RDF configuration of the system may be applied to other system parameters as well, such as BCV configuration. BCV is discussed, for example, in U.S. Pat. No. 6,101,497, which is incorporated by reference herein.

Figure 9:
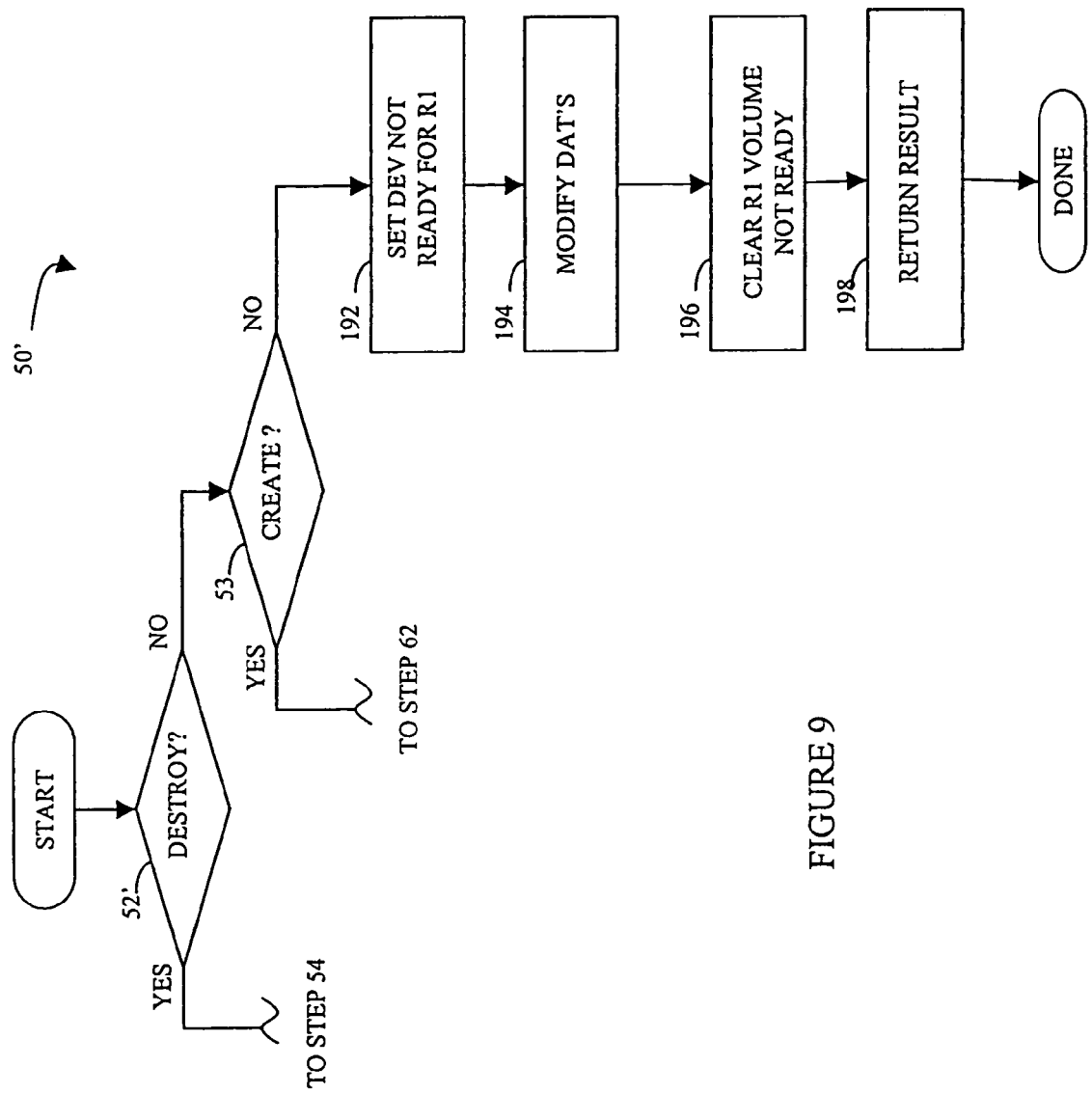
FIG. 9 is a flow chart illustrating an alternative embodiment of the system described herein.

Referring to FIG. 9, a flow chart 50' illustrates an alternative embodiment to the embodiment described in connection with the flow chart 50 of FIG. 2. The flow chart 50 of FIG. 2 shows a system where there are two commands, create and destroy. The system illustrated by the flow chart 50' of FIG. 9 provides for a third command that swaps R1 and R2 in addition to the create and destroy commands discussed above. Swapping R1 and R2 may be performed using a single command that causes the R1 volume to become the R2 volume and causes the R2 volume to become the R1 volume. This may be useful in instances where, for example, a host coupled to a local storage device is replaced by a different host that is coupled to a corresponding remote storage device. The command may be provided by the host. The host may send a multihop/multiexecute system command, such as described in U.S. patent application Ser. No. 09/867,136 filed on May 29, 2001, which is incorporated by reference herein.

Processing begins at a first step 52' where it is determined if a destroy command has been issued. If so, then control passes from the step 52' to the step 54, which is discussed above in connection with the flow chart 50 of FIG. 2. If, on the other hand, it is determined at the step 52' that a destroy command has not been issued, then control passes from the step 52' to a step 53 where it is determined if a create command has been issued. If a create command has been issued, control passes from the step 53 to the step 62, which is discussed above in connection with the flow chart 50 of FIG. 2.

If it is determined at the test step 53 that a create command has not been issued, then a swap R1/R2 command has been issued. That is, in a system having three commands, a process of elimination provides that if it is determined at the step 52' that a destroy command has not been issued, and if it is determined at the step 53 that a create command has not been issued, then a swap R1/R2 command has been issued. Alternatively, a particular portion of code may be executed based on the command received, which could be a swap R1/R2 command. For the swap R1/R2 command, control transfers from the step 53 to a step 192 where the device not ready flag for R1 is set. Setting the device not ready flag for R1 at the step 192 causes RDF operations to cease for the R1/R2 pair. Following the step 192 is a step 194 where an entry for the allocation table corresponding to the storage device containing the R1 volume and an entry for the allocation table corresponding to the storage device containing the R2 volume are both modified so that the R1 volume becomes the R2 volume and vice versa. Following the step 194 is a step 196 where the device not ready bit is cleared for the new R1 device. Clearing the device not ready bit for the R1 volume at the step 196 allows RDF operations to resume. However, when RDF operations resume, the previous R2 volume is now the R1 volume and the previous R1 volume is now the R2 volume. Following the step 196 is a step 198 where the result of the operations corresponding to the command for swapping R1 and R2 (e.g., success or failure) are returned to the host. Following the step 198, processing is complete.

Note that for the system disclosed herein, the host 22 may be a standalone computing device, part of a network, another storage device, a computer having some storage capabilities and/or any device capable of providing the functionality disclosed herein. Similarly, the system disclosed herein may be practiced with any appropriate device used for the local storage device 24, including possibly another computing device, network connection, etc. configured to emulate the local storage device 24 and/or otherwise provide the functionality disclosed herein.

While the invention has been disclosed in connection with various embodiments, modifications thereon will be readily apparent to those skilled in the art. Accordingly, the spirit and scope of the invention is set forth in the following claims.

What is claimed is:

1. A method of handling communication between a local storage device and a remote storage device, comprising:
   receiving a data write to the local storage device;
   accessing an indicator to determine if there have been any changes in communication configuration;
   if the indicator indicates that there have been no changes, accessing local configuration information to determine handling communication of the write between the local storage device and the remote storage device; and if the indicator indicates that there have been changes, accessing additional configuration information to determine handling communication of the write between the local storage device and the remote storage device.

2. A method, according to claim 1, further comprising:
if the indicator indicates that there have been changes, updating the local configuration information with the additional configuration information.

3. A method, according to claim 1, wherein the indicator indicates system changes unrelated to changes in communication configuration.

4. A method, according to claim 3, wherein accessing the indicator to determine if there have been any changes in communication configuration includes examining portions of the indicator corresponding to changes in communication configuration.

5. A method, according to claim 1, further comprising:
examining and updating the local configuration information in response to changes in the additional configuration information, wherein the examining and updating are independent of any writes.

6. A method, according to claim 1, wherein the indicator includes a revision number that is incremented in response to changes in the additional configuration information.

7. A computer program product that handles communication between a local storage device and a remote storage device, comprising:
executable code that receives a data write to the local storage device;
executable code that accesses an indicator to determine if there have been any changes in communication configuration;
executable code that accesses local configuration information to determine handling communication of the write between the local storage device and the remote storage device if the indicator indicates that there have been no changes; and
executable code that accesses additional configuration information to determine handling communication of the write between the local storage device and the remote storage device if the indicator indicates that there have been changes.

8. A computer program product, according to claim 7, further comprising:
executable code that updates the local configuration information with the additional configuration information if the indicator indicates that there have been changes.

9. A computer program product, according to claim 7, wherein the indicator indicates system changes unrelated to changes in communication configuration.

10. A computer program product, according to claim 9, wherein executable code that accesses the indicator to determine if there have been any changes in communication configuration includes executable code that examines portions of the indicator corresponding to changes in communication configuration.

11. A computer program product, according to claim 7, further comprising:
executable code that, independent of any writes, examines and updates the local configuration information in response to changes in the additional configuration information.

12. A computer program product, according to claim 7, wherein the indicator includes a revision number that is incremented in response to changes in the additional configuration information.

13. A storage device, comprising:
a global memory;
a plurality of host interface units coupled to the global memory;
a plurality of disk interface units coupled to the global memory;
a plurality of disk drives coupled to the plurality of disk interface units;
at least one remote adaptor unit coupled to the global memory; and
a computer program, executed on at least one of the host interface units and the disk interface units, wherein the computer program includes executable code that receives a data write to the storage device, executable code that accesses an indicator to determine if there have been any changes in communication configuration, executable code that accesses local configuration information to determine handling communication of the write to the remote storage device if the indicator indicates that there have been no changes and executable code that accesses additional configuration information to determine handling communication of the write to the remote storage device if the indicator indicates that there have been changes.

* * * * *